United States Patent [19]
Garver

[11] 3,846,743

[45] Nov. 5, 1974

[54] THROUGH-HOLE ELECTRICAL CONNECTOR FOR A CIRCUIT BOARD

[75] Inventor: William Joseph Garver, Harrisburg, Pa.

[73] Assignee: AMP Incorporated, Harrisburg, Pa.

[22] Filed: Dec. 11, 1972

[21] Appl. No.: 314,061

[52] U.S. Cl. ............. 339/275 B, 339/17 R, 339/30, 339/258, 174/68.5, 317/101

[51] Int. Cl. ............. H05k 1/10

[58] Field of Search .......... 317/101; 339/17, 18, 19, 339/31, 32, 33, 95, 97, 99, 65, 66, 174, 176, 256, 258, 275 B, 30, 119, 125, 126, 127, 192–194

[56] References Cited

UNITED STATES PATENTS

| | | | |
|---|---|---|---|
| 3,060,402 | 10/1962 | Olsson et al. | 339/275 B X |
| 3,156,517 | 11/1964 | Maximoff et al. | 339/275 B X |
| 3,158,425 | 11/1964 | Pritulsky | 339/258 A |
| 3,369,212 | 2/1968 | Coldren et al. | 339/32 |
| 3,496,516 | 2/1970 | McFadden | 339/18 C |
| 3,617,980 | 11/1971 | Alkire et al. | 339/32 R |
| 3,654,583 | 4/1972 | Mancini | 339/17 C |

*Primary Examiner*—Paul R. Gilliam
*Assistant Examiner*—Terrell P. Lewis
*Attorney, Agent, or Firm*—AMP Incorporated

[57] ABSTRACT

A through-hole electrical connector for flexibly interconnecting preselected areas of electrical circuitry disposed on opposite sides of a circuit board has an elongated body disposable through a hole defined in the board and an elongated arm extending from the body in a substantially transverse relationship to the longitudinal axis of the body. The body has a forward end portion which is tapered inwardly toward the longitudinal axis of the body to facilitate insertion of the body through the hole. The forward end portion of the body is disposable beyond one of the opposite sides of the board by insertion of the body through the hole to facilitate attachment of the forward end portion with one of the preselected areas of electrical circuitry disposed on that one of the opposite sides of the board. The body further has an intermediate portion, which is disposable within the hole by insertion of the body through the hole, the intermediate portion having longitudinally-extending exterior surface portions sufficiently spaced apart from each other, and snugly engageable with side-wall portions of the hole by insertion of the body through the hole, to insure retention of the body in a desired predetermined alignment through the hole. The body still further has a rearward end portion which is disposable beyond the other of the opposite sides of the board by insertion of the body through the hole. The elongated arm has a bendable outer portion which terminates at a free end disposable in a position overlying the other of the preselected areas of electrical circuitry disposed on the other of the opposite sides of the board by insertion of the body through the hole to facilitate attachment of the rearward end portion via the arm with the other preselected area of electrical circuitry. The outer portion of the arm will bend to accommodate expansive and contractive changes in the thickness of the board due to varying environmental conditions imposed on the board while the free end of the outer portion of the arm maintains its attachment to the outer preselected area of electrical circuitry and thereby provides a flexible link in the interconnection provided between the preselected areas of electrical circuitry by the connector.

6 Claims, 8 Drawing Figures

THROUGH-HOLE ELECTRICAL CONNECTOR FOR A CIRCUIT BOARD

BACKGROUND OF THE INVENTION

1. Field Of The Invention

The present invention broadly relates to an electrical circuit board assembly and more particularly is concerned with a through-hole type of electrical connector disposable through a hole defined in a circuit board for flexibly interconnecting preselected areas of electrical circuitry disposed adjacent to the hole on opposite sides of the circuit board.

2. Description Of The Prior Art

In the manufacture of electrical circuit boards, it is common practice to provide electrical circuitry on opposite sides of the circuit boards with a hole defined through the board adjacent to each of a pair of preselected areas of the electrical circuitry disposed on the opposite sides of the board. The hole provides the shortest possible access path along which to provide an interconnection between the oppositely-disposed preselected areas of electrical circuitry.

Various means have been proposed and utilized heretofore in conjunction with the circuit board hole to provide the desired electrical interconnection. These means, denoted as through-hole connectors, generally provide one of two types of mechanical interconnections: either a substantially rigid interconnection structure or a flexible interconnection structure.

A plated through-hole connection and a rivet or eyelet connector generally provide substantially rigid interconnection structures. The rivet or eyelet type of interconnection is illustrated and described in detail in U.S. Pat. Nos. 3,368,188, 3,504,328, 3,601,786 and 3,654,583.

Several connectors which generally provide flexible interconnection structures are illustrated and described in detail in U.S. Pat. Nos. 2,966,652, 3,268,652, 3,354,260, 3,361,869, 3,452,149, 3,484,935, 3,639,978.

Circuit boards are generally fabricated from organic materials, for example, materials having a phenolic or epoxy base, while the through-hole connector, or at least the portion thereof which provides the electrical interconnection, is made from metal. The board undergoes dimensional changes, in thickness, for example, in response to changing environmental conditions such as temperature, while the metal connector undergoes dimensional changes, in length, for example. Because the coefficient of thermal expansion of the organic material of the board is generally substantially greater than the coefficient of thermal expansion of the metal material of the connector, the board will expand (or contract, depending on which way the temperature of the environment is varying) more than will the metal connector.

When a structurally rigid type of through-hole connector is utilized in an environmental subject to a wide range of temperature variation, the difference between the coefficients of expansion of the board and of the rigid metal connector causes severe stresses to be applied on solder joints which conventionally are used to secure the opposite ends of the connector to the oppositely-positioned preselected areas of electrical circuitry. The yield strength of the solder material is ordinarily not sufficient to absorb these stresses. Thus, the stresses create hairline cracks, usually not visible to the naked eye, in the solder joints which tend to eventually propagate completely around the joints and result in broken or intermittent electrical connections which are both difficult to locate and correct. The above-described problem associated with the rigid type of through-hole connector is described in greater detail in the aforementioned U.S. Pat. No. 3,268,652.

While the structurally flexible type of through-hole connectors as disclosed in the aforementioned patents appear to more or less overcome the above-described problem associated with the rigid type of through-hole connectors, it is believed that these connectors are basically impractical and unsatisfactory for one or more of the following reasons: some of the connectors are made of costly materials; some of the connectors require a complicated apparatus for their fabrication; some of the connectors will not additionally receive and grip a conductor wire; and some of the connectors require an inordinate number of assembly steps to achieve their insertion into the circuit board hole and attachment to the preselected areas of electrical circuitry.

OBJECTS AND SUMMARY OF THE INVENTION

The through-hole type of electrical connector of the present invention substantially overcomes all of the aforementioned disadvantages of the above referred to connectors.

An object of the invention, therefore, is to provide a through-hole electrical connector capable of providing a flexible interconnection between preselected areas of electrical circuitry disposed on opposite sides of a circuit board whereby expansive and contractive changes in the thickness of the board due to varying environmental conditions imposed on the board will be accommodated.

Another object of the invention is to provide a through-hole connector which is capable of being fabricated from sheet metal by well known stamping and forming operations.

A further object of the invention is to provide a through-hole connector which is capable of direct insertion into a circuit board hole to its desired predetermined aligned position through the hole in which position the respective portions of the connector are attached, such as by conventional soldering operations, to the preselected areas of the electrical circuit without the need for additional post-insertion forming operations before the soldering operations can be performed.

A still further object of the invention is to provide a through-hole connector which is capable of additionally receiving and gripping a conductor wire without adversely affecting the flexible interconnection provided by the connector. transverse These and other objects of the invention are achieved in a preferred embodiment thereof wherein a through-hole electrical connector is provided having an elongated body disposable through a hole defined in a circuit board and an elongated bendable arm extending from the body in a substantially transverse relationship to the longitudinally axis of the body. By insertion of the body through the hole, a forward end portion of the body is disposable beyond one of the opposite sides of the board to facilitate its attachment to one of two preselected areas of electrical circuitry disposed on opposite sides of the board, an intermediate portion of the body at spaced exterior surface portions thereof is snugly engageable with sidewall portions of the hole, and a rearward end portion of the body is disposable beyond the other of the opposite sides of the board. Further, by insertion of the body through the hole, the elongated bendable arm which extends from the rearward end portion of the body is disposable in a position overlying the other of the preselected areas of electrical circuitry at a free end of the arm to facilitate attachment of the free end to the other preselected area of electrical circuitry on the other side of the circuit board. Further, the respective portions of the body together define a channel through the body capable of receiving a conductor wire therethrough.

Other objects and attainments of the invention will become apparent to those skilled in the art upon a reading of the following detailed description when taken in conjunction with the drawings in which there is shown and described an illustrative embodiment of the invention; it is to be understood, however, that this embodiment is not intended to be exhaustive nor limiting of the invention but is given for purpose of illustration in order that others skilled in the art may fully understand the invention and the principles thereof and the manner of applying it in practical use so that they may modify it in various forms, each as may be best suited to the conditions of a particular use.

BRIEF DESCRIPTION OF THE DRAWINGS

In the course of the following detailed description reference will be frequently made to the attached drawings in which.

DETAILED DESCRIPTION OF THE PREFERRED EMBODIMENT

Figure 1:
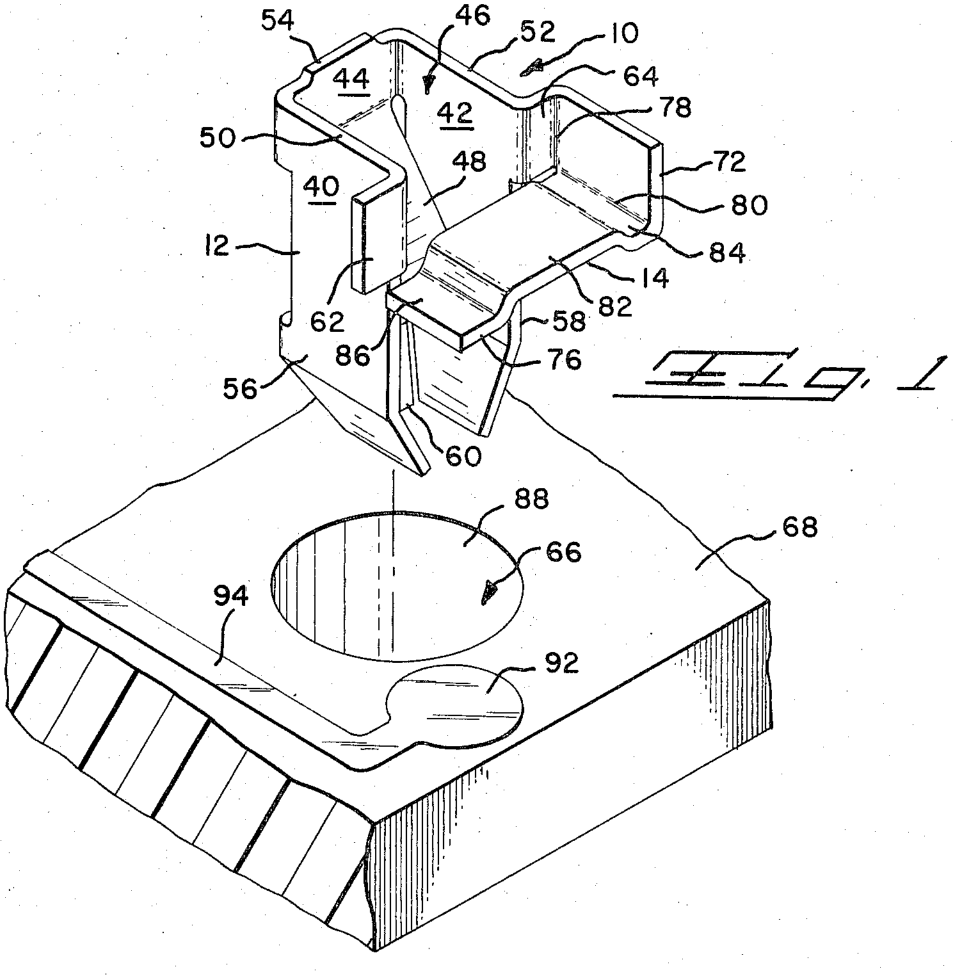
FIG. 1 is a perspective view of the through-hole electrical connector embodying the principles of the present invention showing the connector prior to its insertion into a hole of a circuit board.

Referring now in greater detail to the various figures of the drawings wherein like reference characters refer to like parts, there is shown at 10 in FIG. 1 a through-hole electrical connector forming the preferred embodiment of the present invention. The connector 10 is comprised by an elongated body 12 and an elongated arm 14 extending from the body 12 in a substantially transverse relationship to the longitudinal axis of the body 12.

Figure 6:
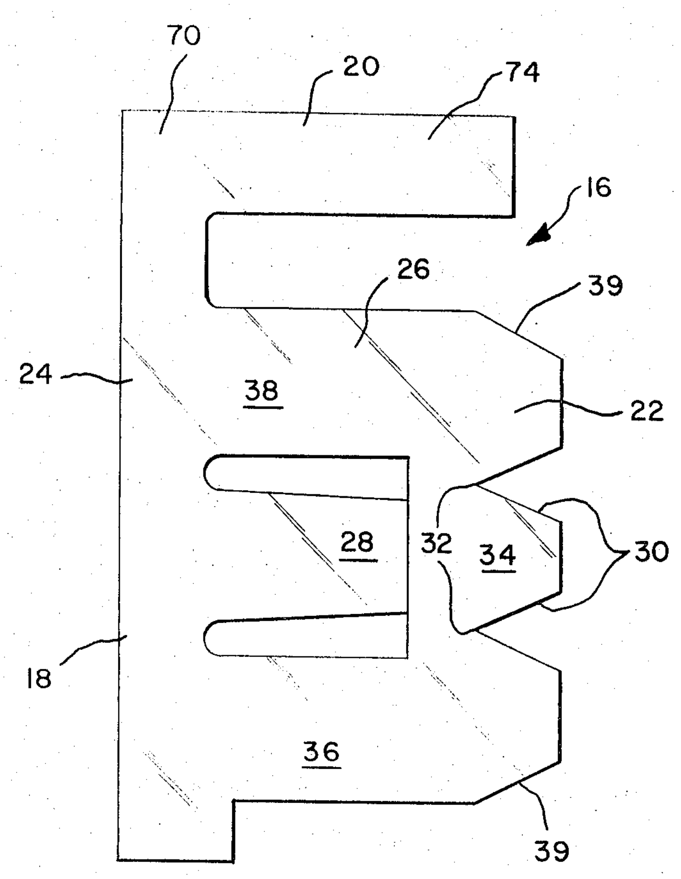
FIG. 6 is a plan view of a stamped out sheet metal blank from which is formed the connector shown in FIG. 1.

A blank 16 from which the connector 10 is formed is illustrated in FIG. 6. The blank 16 may be stamped out from any suitable sheet of metal, such as pre-tin plated brass.

The blank 16 has a body blank section 18 and an arm blank section 20. The body blank section 18 includes a forward blank portion 22, a rearward blank portion 24, and an intermediate blank portion 26 therebetween. A finger blank portion 28 is sheared out from the intermediate blank portion 26 of the body blank section 18 during the stamping operation. Further, V-shaped notches 30 are cut into the forward blank portion 22 of the body blank section 18 during the stamping operation. An apex 32 of each notch 30 is generally aligned with a sheared-out area of the intermediate blank portion 26 on either side of the finger blank portion 28 to thereby approximately trisect the body blank section 18 into three longitudinal parts: a base blank member 34, and a pair of side blank members 36, 38 which extend outwardly from opposed longitudinal edges of the base blank member 34. Also, the opposing corners of the forward blank portion 22 are diagonally sheared off at 39. Thus, the base and side blank members 34, 36, 38 are provided with bevelled edges of their forward ends.

By the utilization of conventional forming dies, the arm blank section 18, the finger blank portion 28, and the base and side blank members 34, 36, 38 of the body blank section 18 are bent to the shape as shown in FIG. 1 to thereby form the connector 10.

In particular, the side blank members 36, 38 of the body blank section 18 are bent toward each other, each through an angle of approximately 90° in relation to the base blank portion 34, so as to form the elongated body 12 comprised by a pair of side members 40, 42 which extend outwardly from opposed longitudinal edges, and the same side, of a base member 44. The members 40, 42, 44 together define a channel 46 through the body 12 capable of receiving a conductor wire (not shown) therethrough.

Further, the finger blank portion 28 is bent in the same direction as are the side blank members 36, 38 through an angle of approximately 45° so as to form a bendable finger element 48 merging from the base member 44 of the body 12 and extending into the channel 46, the finger element 48 facilitating retention of the conductor wire (not shown) in the channel 46 of the body 12.

Accordingly, the side members 40, 42 are connected at their respective rearward end portions 50, 52 to the rearward end portion 54 of the base member 44, and the side members 40, 42 are also connected at their respective forward end portions 56, 58 to the forward end portion 60 of the base member 44. The rearward end portion 50, 52 of side members 40, 42 respectively include extensions 62, 64 which project outwardly from respective edges of the side members 40, 42 at an angle of approximately 90° thereto and in a substantially transverse relationship to the longitudinal axis of the body 12, which edges are disposed oppositely from the edges at which the side members 40, 42 are connected to the base member 44. Preferably, extension 62 on the rearward end portion 50 of the side member 40 serves as a stop means for facilitating insertion of the body 12 to a desired predetermined position through the hole 66 defined through the circuit board 68. The functioning of the stop means extension 62 will be described in further detail later. The forward ends of the members 40, 42, 44 between the respective bevelled edges thereon are each bent toward the longitudinal axis of the body 12 through an angle of approximately 30° to thereby form a tapered forward end on the body 12 which facilitates insertion of the body 12 through a hole 66 defined through a circuit board 68. Furthermore, the side members 40, 42 are bendable toward each other which facilitates insertion of the body 12 through the circuit board hole 66.

The arm blank section 20 is preferably L-shaped and extends from one side of the rearward blank portion 24 of the body blank section 18. Specifically an inner blank portion 70 is bent through an angle of approximately 90° in relation to the rearward blank portion 24, so as to form an inner portion 72 of the elongated arm 14. An outer blank portion 74 is bent through an angle of approximately 90° in relation to the inner blank portion 70, so as to form an outer portion 76 of the elongated arm 14. Therefore, in the final shape of the connector 10 as shown in FIG. 1, the inner portion 72 of the arm 14 merges from extension 64 on the rearward end portion 52 of the side member 42 along a first edge 78 of the inner portion 72 which extends substantially parallel to the longitudinal axis of the body 12. Further, the inner portion 72 of the arm 14 extends in a longitudinal sense from the rearward end portion 52 in a substantially transverse relationship to the longitudinal axis of the body 12. Also, in the final shape of the connector 10 as shown in FIG. 1, the outer portion 76 of the arm 14 merges from the inner portion 72 along a second edge 80 of the inner portion 72 which extends substantially perpendicular to the longitudinal axis of the body 12. Further, the outer portion 76 extends from the inner portion 72 in a substantially transverse relationship to both the longitudinal axis of the body 12 and the longitudinal extent of the inner portion 72. Preferably, the outer portion 76 has a raised intermediate portion 82 which tends to concentrate the bending of the outer portion 76 in relation to the inner portion 72 about a fulcrum in a region of the outer portion 76 designated as 84 which is located adjacent to the second edge 80 of the inner portion 72. Also, the outer portion 76 terminates at a free end designated as 86.

After the blank 16 has been bent by conventional forming dies into the above-described shape of the connector 10 as shown in FIG. 1, the connector 10 is now in condition for insertion directly through the hole 66 of the circuit board 68.

Figure 2:
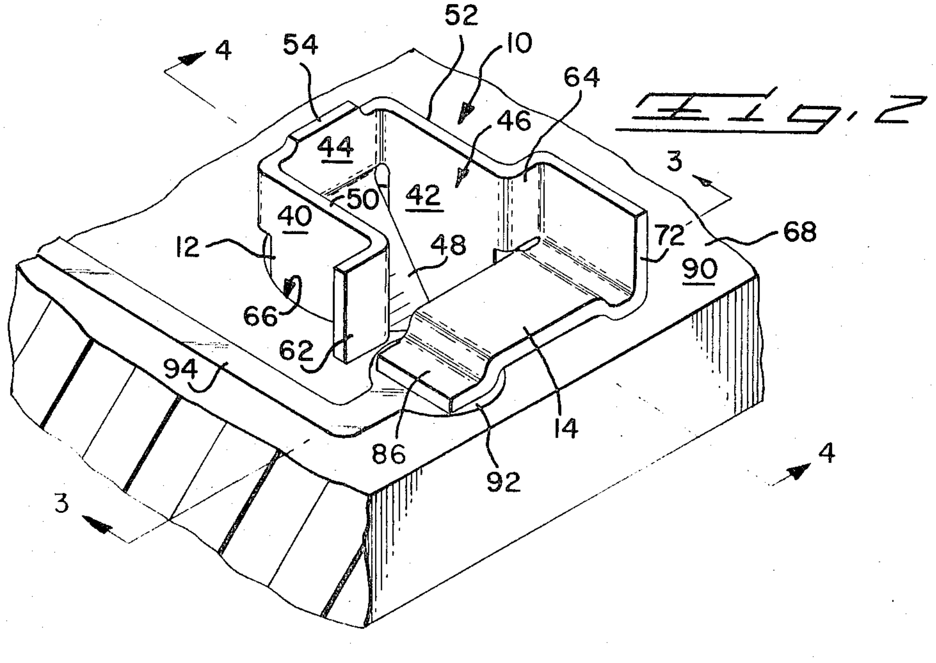
FIG. 2 is a perspective view similar to FIG. 1 but showing the connector after its insertion into the circuit board hole.

FIG. 1 illustrates the connector 10 aligned with the circuit board hole 66 prior to its insertion through the hole. The tapered contour of the forward end of the body 12 as formed by the forward ends of members 40, 42, 44 provides sufficient clearance between the sidewall 88 of the hole 66 and the forward end of the body 12 to facilitate insertion of the body 12 through the hole 66. In the rectangular cross-sectional configuration of the preferred embodiment of the body 12 prior to its insertion through the hole 66, the width of each of the side members 40, 42 and the base member 44 is substantially less than the diameter of the circular hole 66 while the distance between respective opposing longitudinal edges of the respective side members, as taken along a diagonal line across the body 12, is slightly greater than the diameter of the hole 66. Therefore, after partial insertion of the tapered forward ends of members 40, 42, 44 of the body 12 into the hole 66, the tapered forward ends of side members 40, 42 act as camming surfaces for the remaining portions of the members 40, 42 to initiate flexing or bending of the side members 40, 42 toward each other to the extent that the above-referred to diagonal distance between the respectively opposed longitudinal edges of the members becomes slightly less than the diameter of the hole 66, whereby continued insertion of the body 12 through the hole 66 is facilitated until the stop means extension 62 engages the top surface 90 of the circuit board 68 as shown in FIG. 2. In the preferred embodiment, the extension 62 is longer than the oppositely disposed extension 64 whereby extension 62 will be the one which engages the top surface 90. However, alternatively, extension 62 may be omitted and extension 64 utilized as the stop means. Further, alternatively, the region 84 of the arm 14 could serve as the stop means.

Once the connector body 12 has been inserted through the hole 66 to a desired predetermined alignment therein as shown in FIG. 2, the inherent resiliency of the side members 40, 42, which are now in a flexed or deformed condition, urges the members 40, 42 in a direction away from each other and toward their original unflexed condition and thereby maintains the longitudinal edges of the side members 40, 42 in snug engagement with sidewall portions of the hole 66 which insure retention of the body 12 in the desired predetermined alignment through the hole 66. In such alignment, as depicted in FIGS. 2 through 5, the free end 86 of the outer arm portion 76 overlies a preselected area 92 of the electrical circuitry 94 disposed on the top surface 90 of the circuit board 68 and adjacent to the hole 66. Further, the forward end portions 56, 58, 60 of the side and base members 40, 42, 44 respectively, which now extend beyond a bottom surface 96 of the circuit board 68, are disposed adjacent to a preselected area 98 of the electrical circuitry 100 disposed on the bottom surface 96 and adjacent to the hole 66.

Figure 3:
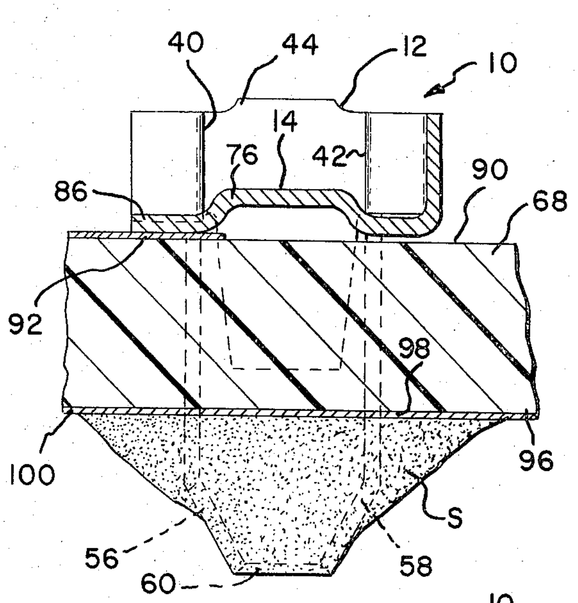
FIG. 3 is a vertical sectional view taken along line 3—3 of FIG. 2 showing the connector inserted through the circuit board hole.

With the free end 86 of the arm 14 and the forward end portions 56, 58, 60 of the members 40, 42, 44 in those respective positions, attachment operations may now be carried out. The forward end portions 56, 58, 60 of the members 40, 42, 44 are exposed directly to a bath of molten solder in order to achieve attachment in a conventional manner of this portion of the connector 10 to the preselected area 98 of the electrical circuitry 100 disposed on the bottom surface 96 of the board 68. During the soldering operation, the portion of the circuit board 68 adjacent to the location at which the solder connection is being made will be heated to temperatures approaching that of the molten solder, that being approximately 550° F. As the temperature of this portion of the board increases, the thickness of the board increases by an amount substantially greater than that by which the connector body 12 elongates as the temperature of the body 12 rises because of the substantial difference between the respective coefficients of thermo expansion of the board 68 and the metal body 12. Thus, cross-sectional portions of the board undergo expansive movement relative to the connector body. Further, once the board is removed from contact with the bath of molten solder and the molten solder adhering to the connector body 12 and the preselected circuit area 98 to provide the connection therebetween begins to decrease in temperature and solidify, the temperatures of the board and connector body slowly decrease to their original levels and again cross-sectional portions of the board undergo contractive movement relative to the connector body. As the temperature of the solder falls below its melting temperature and the solder solidifies, the solid solder S will prevent movement of the forward end of the connector body 12 relative to the bottom surface 96 of the board 68. Therefore, the contractive movement of the board 68 relative to the connector body 12 is manifested at the top surface 90 of the board 68 which results in the extension 62 now being displaced from the top surface 90 of the board 68 as well as extension 64 and region 84 of the arm 14 now being displaced from the top surface 90 of the board 68 through a distance greater than their original displacement from the board which existed immediately before the soldering operation. FIG. 3 depicts extensions 62, 64 and region 84 of the arm 14 spaced from top surface 90 of the board 68 after solidification of solder S. Now that the extensions 62, 64 and region 84 of the arm 14 are spaced from the top surface 90 of the board 68, subsequent expansive movements of the board relative to the connector body, as caused by ordinary environmental conditions to which the board may be exposed during its intended uses, such as temperatures below 550°F, will not be impeded by any rigid structural features of the connector body.

The sheared out opening 102 in the base member 44 extends partially beyond the bottom surface 96 and allows entry of molten solder into the channel 46 of the body 12 during the soldering operation whereby a connection may be achieved between a conductor wire (not shown) retained within the channel 46 and the connector body 12.

Figure 7:
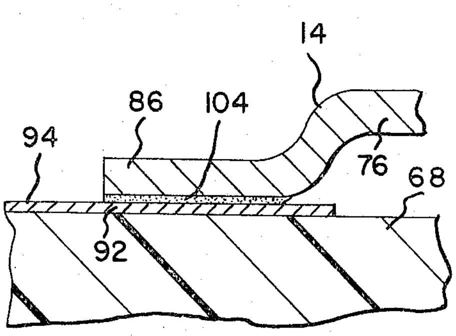
FIG. 7 is an enlarged fragmentary sectional view of the free end of the bendable arm of the connector showing the free end soldered to one of the preselected areas of electrical circuitry of the circuit board.
Figure 8:
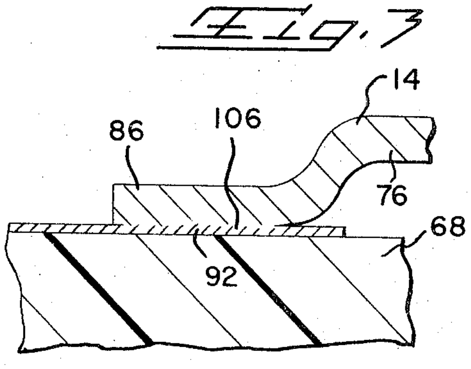
FIG. 8 is a view similar to that of FIG. 7 but alternatively showing the free end ultrasonically bonded to one of the preselected areas of electrical circuitry of the circuit board.
Figure 4:
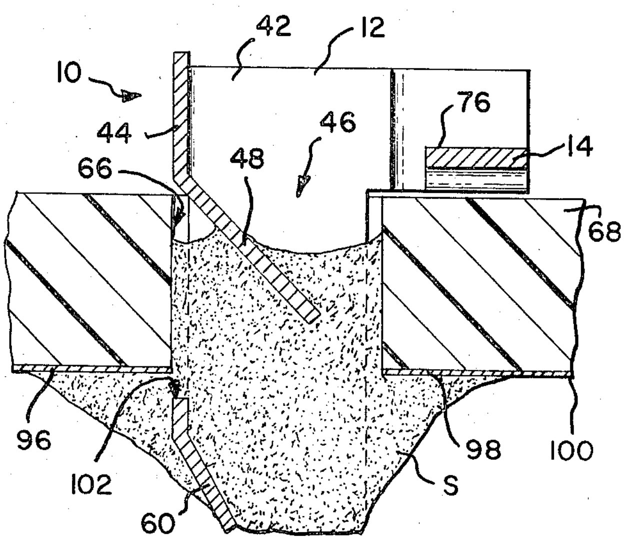
FIG. 4 is another vertical sectional view taken along line 4—4 of FIG. 2 showing the connector inserted through the circuit board hole.
Figure 5:
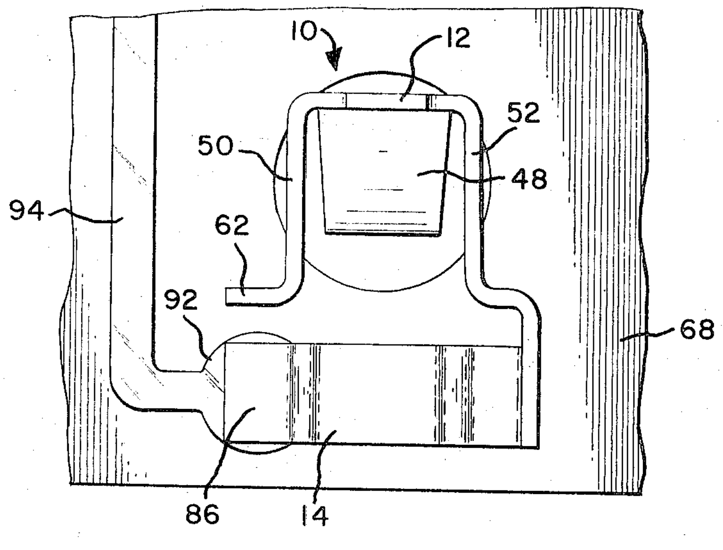
FIG. 5 is a top plan view of the connector inserted through the circuit board hole as shown in FIG. 2.

The free end 86 of the arm 14 is selectively soldered in a conventional manner to the preselected area 92 of the electrical circuitry 94 disposed on the top surface, as shown in final form in FIG. 7 with the solder bond designated 104. Alternatively, the free end 86 of the arm 14 may be ultrasonically bonded by conventional methods to the preselected circuit area 92 as shown in FIG. 8 with the ultrasonic bond designed 106.

When the connector 10 is attached to the preselected areas 92, 98 of electrical circuitry 94, 100 as described hereinbefore, the outer portion 76 of the arm 14 will bend to accommodate expansive and contractive changes in the thickness of the board 68 due to varying environmental conditions imposed on the board while the free end 86 of the outer portion 76 of the arm 14 maintains its bonded attachment to the preselected circuit area 92. In such manner, the outer portion 76 of the arm 14 provides a flexible link in the interconnection provided between the preselected circuit areas by the connector 10.

It is thought that the invention and many of its attendant advantages will be understood from the foregoing description and it will be appraent that various changes may be made in the form, construction and arrangement of the connector described without departing from the spirit and scope of the invention or sacrificing all of its material advantages, the form hereinbefore described being merely a preferred embodiment thereof.

What is claimed is:

1. A through-hole electrical connector for flexibly interconnecting electrical circuitry on opposite sides of a circuit board, said connector comprising:

an elongated body disposable through a hole defined in said board, said body having forward and rearward opposing end portions and an intermediate portion therebetween, said forward end portion being tapered inwardly toward the longitudinal axis of said body to facilitate insertion of said body through said hole and being disposable beyond one of said opposite sides of said board by insertion of said body through said hole to facilitate attachment of said forward end portion with the electrical circuitry disposed on said one of said opposite sides of said board, said intermediate portion being disposable within said hole by insertion of said body through said hole, and said rearward end portion being disposable beyond the other of said opposite sides of said board by insertion of said body through said hole; and an elongated arm, said arm having an inner portion which is connected with said rearward end portion of said body and lies in a plane generally parallel to said axis of said body, a bendable outer portion which merges from said inner portion along an edge of said inner portion extending substantially perpendicular to the longitudinal axis of said body, said bendable outer portion extending from said inner portion in a substantially transverse relationship to both the longitudinal axis of said body and said inner portion, said bendable outer portion being disposable in a position overlying a surface portion of said other of said opposite sides of said board by insertion of said body through said hole, said bendable outer portion having a free end, said free end being disposable in a position overlying the portion of the electrical circuitry disposed on said other of said opposite sides of said board by insertion of said body through said hole to facilitate attachment of said rearward end portion via said arm with said other preselected area of electrical circuitry, whereby said outer portion of said arm will bend to accommodate expansive and contractive changes in the thickness of said board due to varying environmental conditions imposed on said board while said free end of said outer portion of said arm maintains its attachment to said other preselected area of electrical circuitry and thereby provide a flexible link in the interconnection provided between said preselected areas of electrical circuitry by said connector.

2. A through-hole electrical connector as claimed in claim 1 further comprising:

a stop means for facilitating insertion of said body to a desired predetermined position through said hole, said stop means projecting outwardly from said rearward end portion in a substantially transverse relationship to the longitudinal axis of said body and being disposable adjacent to another surface portion of said other of said opposite sides of said board by insertion of said body through said hole.

3. In a circuit board assembly which includes a dielectric board having electrical circuitry disposed on opposite sides of said board and a hole defined therethrough which opens at said opposite sides adjacent to preselected areas of said electrical circuitry, a through-hole type of electrical connector inserted through said hole for flexibly interconnecting said preselected areas of said electrical circuitry disposed on said opposite sides of said board, said connector being comprised by:

an elongated body disposed through said hole of said board, said body having forward and rearward opposing end portions and an intermediate portion therebetween, said forward end portion being tapered inwardly toward the longitudinal axis of said body and being disposed beyond one of said opposite sides of said board to facilitate attachment of said forward end portion with one of said preselected areas of said electrical circuitry disposed on said one of said opposite sides of said board, said intermediate portion being disposed within said hole and having exterior surface portions sufficiently spaced apart from each other, and snugly engaged with sidewall portions of said hole to insure retention of said body in a desired predetermined alignment through said hole, and said rearward end portion being disposed beyond the other of said opposite sides of said board; and an elongated arm, said arm having an inner portion which is connected with said rearward end portion of said body and lies in a plane generally parallel to the axis of said body, a bendable outer portion which merges from said inner portion along an edge of said inner portion extending substantially perpendicular to the longitudinal axis of said body, said bendable outer portion extending from said inner portion in a substantially transverse relationship to both the longitudinal axis of said body and said inner portion, said bendable outer portion being disposed in a position overlying a surface portion of said other of said opposite sides of said board, said bendable outer portion having a free end, said free end being disposed in overlying contact with the other of said preselected areas of said electrical circuitry disposed on said other of said opposite sides of said board whereby said outer portion of said arm will bend to accommodate expansive and contractive changes in the thickness of said board due to varying environmental conditions imposed on said board while said free end of said outer portion of said arm maintains its attachment to said other preselected areas of said electrical circuitry and thereby provide a flexible link in the interconnection provided between said preselected areas of said electrical circuitry by said connector.

4. In a circuit board assembly as defined in claim 3 wherein:

said forward end portion is soldered to said one preselected area of said electrical circuitry; and said free end of said bendable outer portion of said elongated arm is soldered to said other preselected area of said electrical circuitry.

5. In a circuit board assembly as defined in claim 3 wherein:

said free end of said bendable outer portion of said elongated arm is ultrasonically bonded to said other preselected area of said electrical circuitry.

6. In a circuit board assembly as defined in claim 5 wherein:

said forward end portion is soldered to said one preselected area of said electrical circuitry.

* * * * *